May 26, 1931. E. D. DUNNING 1,807,029
VALVE MECHANISM FOR COMPRESSORS
Filed June 19, 1928 2 Sheets-Sheet 1

Inventor
Elmer D. Dunning
By
H. Clyde Grout.
Attorney

May 26, 1931. E. D. DUNNING 1,807,029
VALVE MECHANISM FOR COMPRESSORS
Filed June 19, 1928 2 Sheets-Sheet 2

Inventor
Elmer D. Dunning
R. Clyde Grubb
By
Attorney

Patented May 26, 1931

1,807,029

UNITED STATES PATENT OFFICE

ELMER D. DUNNING, OF STONEHURST, UPPER DARBY, PENNSYLVANIA, ASSIGNOR TO KULAIR CORPORATION, OF PHILADELPHIA, PENNSYLVANIA, A CORPORATION OF DELAWARE

VALVE MECHANISM FOR COMPRESSORS

Application filed June 19, 1928. Serial No. 286,691.

This invention relates to certain improvements in compressors, and particularly to single cylinder gas compressors.

More specifically, the improvements are directed to the valve construction with special reference to the novel arrangement and formation of the exhaust valve assembly.

In the present instance these valves are of the sheet metal flap type, the inlet valve being preferably a disk carried by the head of the piston and the exhaust valve a sheet metal strip or plate held normally in closed position by a superimposed bowed flat spring also preferably of sheet metal, said exhaust valve and spring being secured to the cylinder head by screw bolts or the like passing through enlarged openings provided in the ends of these parts as shown, whereby the valve is free to reciprocate to a limited extent and the spring is capable of being flexed during the operation of said parts.

By the foregoing arrangement the exhaust valve assembly is securely anchored in operative position in a more or less floating manner as distinguished from prior valve constructions of this type, which are either, so rigidly secured at certain portions that a fracture or break occurs at the securing point under actual working conditions, or no means of securing is provided at all, causing great difficulty in assembling and an ultimate disarranging of the parts after constant service.

It is the object of this invention to provide a simple and economical valve construction whereby the various parts are accurately and securely positioned without danger of breakage or disarranging of any of the parts of the valve assembly. Furthermore the simple valve parts can be made from stampings which is highly important in quantity production.

A further object is to produce a valve construction that can be quickly and accurately assembled without requiring any fine adjustments or particularity in assembling.

A further object of the invention is to produce a valve that under working conditions will normally require only a small valve lift but at the same time said parts being capable of opening very wide or to an extent approximating the full size of the port should oil or liquid have to pass through the valve under operative conditions.

Figure 1:
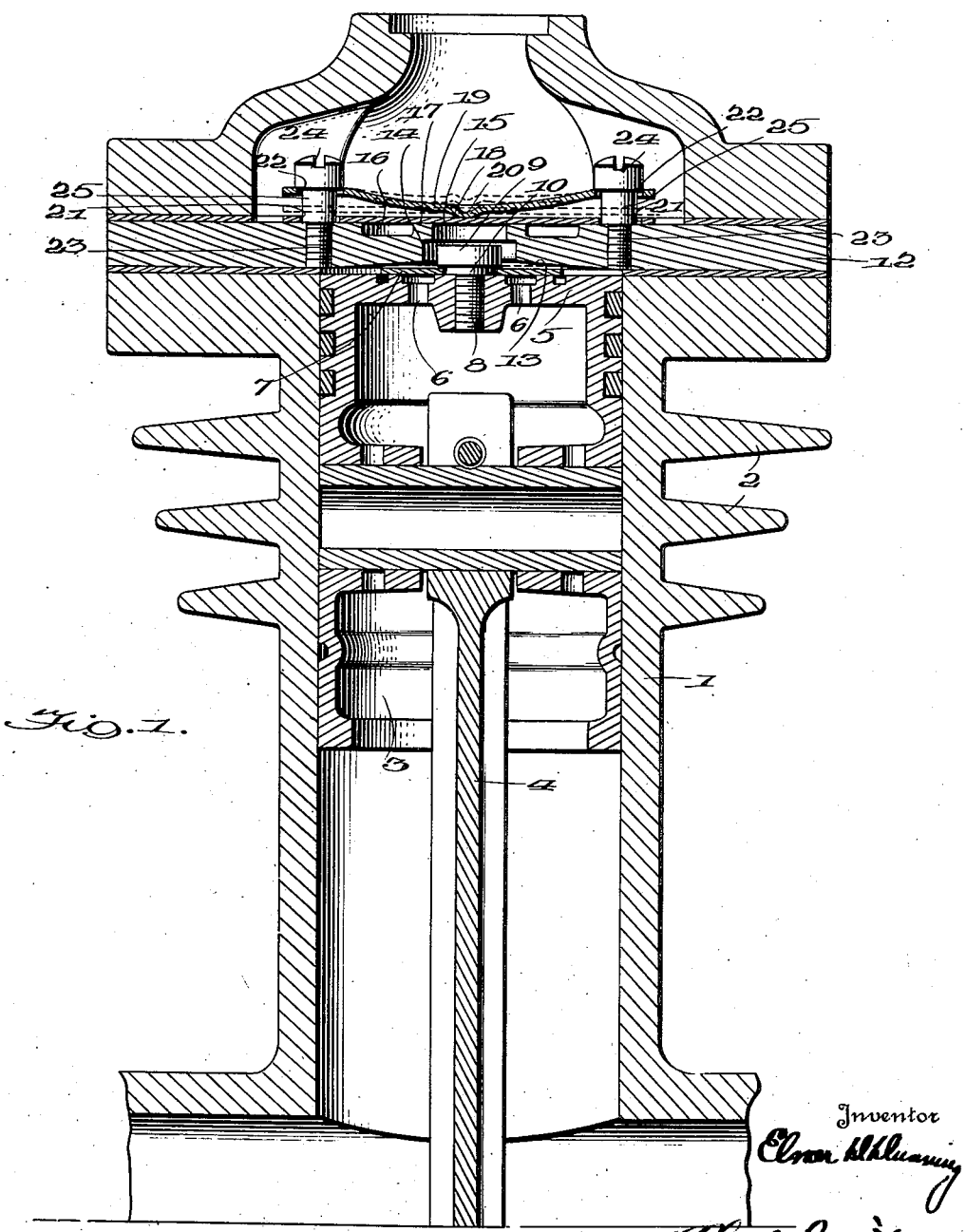
Figure 3:
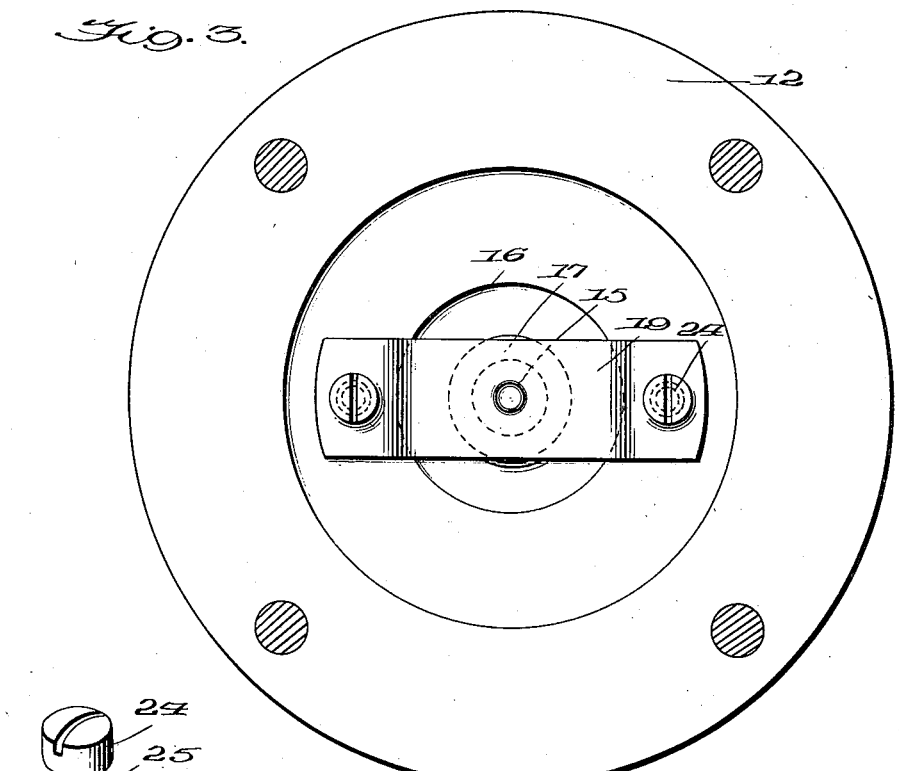
Figure 2:
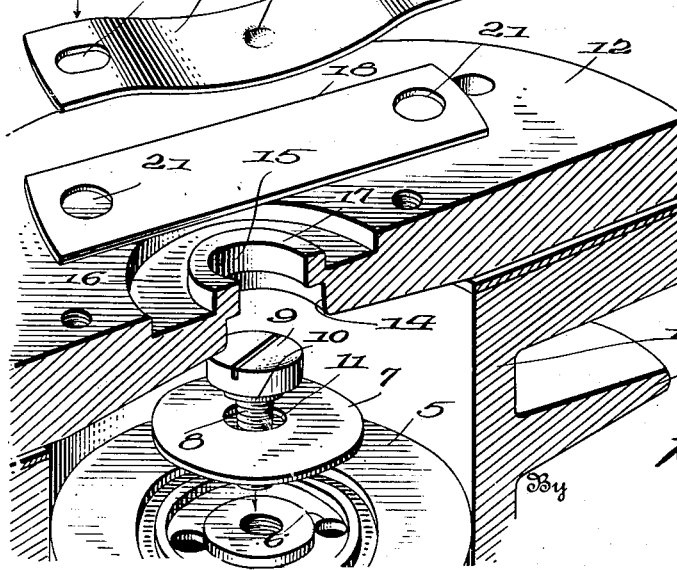

The preferred embodiment of the invention is illustrated in the accompanying drawings in which Fig. 1 is a vertical sectional view of a single cylinder compressor showing the various parts in operative relation;

Fig. 2 is an enlarged view partly in perspective and partly in section, more clearly showing the manner of assembling the valve members or mechanism; and Fig. 3 is an enlarged top plan view of the cylinder head illustrating the relative position of the exhaust valve.

Referring to the drawings in detail 1 represents a compressor cylinder provided with the usual radiating cooling fins or the like 2, said cylinder having associated therewith a piston 3 provided with the usual connecting rod 4, the lower end of said connecting rod and the remaining compressor mechanism below the cylinder being eliminated for the purpose of clearness in illustration as this eliminated mechanism forms no part of the present invention.

The head 5 of the piston is provided with ports or apertures 6 forming communication between the crank case or lower part of the cylinder and that part of the cylinder above the head of the piston so that on the down stroke of said piston, the fluid to be compressed flows upwardly and through the ports 6, said ports 6 to be hereinafter known as inlet ports. Controlling the inlet ports 6 is preferably a disk valve member 7, said disk valve being secured to the upper face of the piston head by a screw bolt or the like 8. This fastening or bolt 8 is provided with a head 9 and a reduced portion 10 immediately below the head, said reduced portion 10 adapted to pass through a concentric opening 11 in the disk valve, this opening 11 being of slightly larger diameter than the reduced portion 10 of the screw bolt 8 in order to prevent any binding or friction between these parts during the raising and lowering of the disk valve member 7. It is to be also noted that the head 9 and reduced portion 10 is so constructed as to permit this slight reciprocation of the disk valve member 7.

It is believed the operation of this disk valve just described will be perfectly obvious. On the descent of the piston 3 the valve will open sufficiently to permit the fluid to be compressed, to pass through the inlet ports 6 and up into that portion of the cylinder above the piston. On the upward stroke of said piston the disk valve 7 will automatically close and permit the fluid to be compressed in the usual manner.

The cylinder 1 is provided with a head or the like 12, that portion of the head immediately above the cylinder chamber being slightly concave as shown at 13, said concavity having formed concentrically therewith an annular recess 14 communicating with an opening or port 15 to be hereinafter referred to as the exhaust port. The concavity 13 formed in the cylinder head is provided to prevent hammering or knocking of the compressor caused by a certain amount of oil or lubricant passing by the rings of the piston and getting up into the upper part of the cylinder chamber. This is particularly noticeable in compressors of this type as a very slight clearance is provided between the head of the piston and the cylinder head when the piston is in its extreme upper position. By providing the concavity 13 in the cylinder head immediately above the piston head, this hammering or knocking is entirely avoided and any oil accumulation will be forced out through the exhaust port. This will be further augmented by the provision of the recess 14, said recess at the same time allowing a clearance space for the head 9 of the screw bolt 8 associated with the disk valve member 7.

The upper face of the cylinder head is provided with an annular recess 16 and thus forming in combination with the exhaust port 15 an annular exhaust valve seat 17. Cooperating with the annular valve seat 17 is a flap valve member 18 preferably made of spring sheet metal and cooperating with said flap valve member 18 is a bowed spring or the like 19 likewise made of resilient sheet metal, the intermediate portion of said resilient member 19 being provided with a downwardly projecting knob-like portion 20 in direct contact with the upper face of the valve member 18, which knob-like portion forms a centralizing pivot or the like for the valve member 18 during the operation of said parts.

The superimposed ends of the valve member 18 and resilient member 19 are provided with apertures or openings 21 and 22 respectively through which screw bolts or the like 23 are adapted to pass for the purpose of anchoring these parts in the position as above described, said screw bolts 23 being threaded into the cylinder head 12. The screw bolts 23 are provided with enlarged heads 24 and reduced portions 25. The openings 21 and 22 in the ends of the exhaust valve member 18 and cooperating resilient member 19 respectively are adapted to receive the reduced portions 25, which reduced portions are slightly smaller in diameter than the size of the openings 21 and 22 for the purpose of permitting the reciprocation of the exhaust valve member 18 without danger of binding or sticking. These openings 21 are preferably circular but the openings 22 are elongated. The reason for this difference will be perfectly obvious as the exhaust valve member 18 merely rises and falls bodily in a vertical direction, whereas only the central portion or that portion radiating from the middle of the resilient member 19 rises and falls and in doing so causes a radial movement of the ends of said resilient member for the reason that said ends are anchored against any upward movement by reason of the enlarged heads 24 of the screw bolts 23 as is necessary in order that the resilient member 19 can function as a spring to urge the exhaust valve member 18 on its seat 17.

From the foregoing description it will be apparent that during the operation of the compressor and the functioning of the valves there is no abrupt bending or stressing of any part of either the inlet valve or exhaust valve. Referring more particularly to the exhaust valve it is to be noted that the inherent resiliency of the exhaust valve member 18 will permit said valve to flex slightly, each side of its middle portion to provide a small or an initial opening of the valve without flexing the spring. Before, however, this valve member 18 is flexed to any appreciable degree, any further pressure will be absorbed or resisted by the resilient member 19 cooperating with the exhaust valve member and in contact therewith whereby the flexing strain of these parts caused by the opening and closing of the exhaust valve member 18 will be absorbed partly by the valve member 18 and partly by the resilient member 19 in a gradual and uniform manner without putting any great amount of strain or wear on any part of this valve assembly yet at the same time said parts are accurately and securely anchored in operative position. In other words this valve assembly has all the advantages of the full floating type of valve of this character without any of the disadvantages, and likewise has all of the advantages of the anchored valve without any of the disadvantages of this latter type, speaking of course with particular reference to the spring metal flap type of valve. Heretofore in spring metal flap valve constructions and cooperating flat springs that are securely mounted at one point or another, the continual flexing of the valve will result in a final cracking or breaking of said valve and spring at the point where it is secured in position as practically all of the strain is taken at this point and said point is also further weakened by openings or the like for the securing means.

Applicant is not to be limited to the specific construction as shown, as it will be apparent that the invention is capable of many variations and modifications within the scope of the claims.

What I claim is:

1. In a valve, the combination with a member provided with a port, of a metallic plate-like valve member for controlling said port, a metallic spring for normally holding said valve member in closed position, a point contact between the intermediate portion of said spring and valve member and means passing through the superimposed ends of the valve member and spring for anchoring said parts in operative relation in such a manner as to permit a limited reciprocation of the valve member and the flexing of the spring without increasing the bearing contact between the spring and valve.

2. In a valve, the combination with a member provided with a port, of a metallic plate-like valve member for controlling said port, a metallic plate-like spring for normally holding said valve member in closed position, an integrally formed projection carried by the intermediate portion of said spring adapted to provide a point contact between the spring and said valve member, and means passing loosely through the superimposed ends of the valve member and spring for anchoring said parts in operative relation and also permit a limited reciprocation of the valve member and the flexing of the spring.

3. In a valve, the combination with a member provided with a port, of a metallic plate-like valve member for controlling said port, a bowed metallic spring for normally holding said valve member in closed position, a point contact between the intermediate portion of said spring and valve member and means passing loosely through the superimposed ends of the valve member and spring for anchoring said parts in operative relation and also permit a limited reciprocation and flexing of the valve member and a flexing of the spring, whereby said flexing is distributed throughout these parts without increasing the bearing contact between the spring and valve.

4. In a valve, the combination with a member provided with a port, of a metallic plate-like valve member for controlling said port, a metallic bowed spring for normally holding said valve member in closed position, a point contact between the intermediate portion of said spring and valve member and means passing loosely through the superimposed ends of the valve member and spring for anchoring said parts in operative relation and also permit a limited reciprocation and flexing of the valve member and a flexing of the spring without increasing the bearing contact between the spring and valve member, whereby said flexing is distributed uniformly throughout these parts.

5. In a valve, the combination with a member provided with a port, of a metallic plate-like valve member for controlling said port, an inherently resilient metallic bowed spring for normally holding said valve member in closed position, a point contact between the intermediate portion of said spring and valve member and means passing loosely through the superimposed ends of the valve member and spring for semi-positively anchoring said parts in operative relation in such a manner as to permit a limited reciprocation and flexing of the valve member and a flexing of the spring without increasing the bearing contact between the spring and valve whereby said flexing is distributed uniformly through these parts.

6. In a valve, the combination with a member provided with a port, of a metallic plate like valve member for controlling said port, an inherently resilient metallic bowed spring for normally holding said valve member in closed position, an integrally formed projection carried by the intermediate portion of said spring adapted to provide a point contact between the spring and said valve member, and means passing loosely through the superimposed ends of the valve member and spring for semi-positively anchoring said parts in operative relation in such a manner as to permit a limited reciprocation and flexing of the valve member and a flexing of the spring without increasing the bearing contact between the spring and valve. whereby said flexing is distributed uniformly throughout these parts.

In testimony whereof I affix my signature.

ELMER D. DUNNING.